June 5, 1951  F. G. HODSDON  2,555,543
MILKER PAIL COVER WITH FLUID TRAP CHAMBER
Filed Dec. 4, 1948

Inventor:
Floyd G. Hodsdon
Paul O. Pippel
Atty.

Patented June 5, 1951

2,555,543

UNITED STATES PATENT OFFICE 2,555,543

MILKER PAIL COVER WITH FLUID TRAP CHAMBER

Floyd G. Hodsdon, Milwaukee, Wis., assignor to International Harvester Company, a corporation of New Jersey Application December 4, 1948, Serial No. 63,569

1 Claim. (Cl. 119—14.46)

This invention relates to a milker unit and more specifically to a fluid trap for preventing undesirable liquids from entering into a milking receptacle.

Milking units of the type with which the present invention is concerned are well-known to those familiar with the art. Among other things, a milking unit generally consists of a milker pail or receptacle. The milker pail includes a removable cover which is held in place to seal the receptacle during the milking operation by the vacuum depression in the pail. The cover generally has a pet cock mounted thereon, the pet cock in turn having communication with a milk hose which is attached to the milker claw of the system. The milker claw may be of a conventional design and includes a plurality of rubber connections which in turn are connected to the teat cups. The teat cups also are connected to a source of alternating vacuum and air pressure which is produced by a pulsating device. The pulsating device is in communication with a source of vacuum, generally a stanchion hose, and the vacuum operates the pulsator in a well-known manner. The pulsator is generally mounted on the cover of the milker pail and a vacuum connection between the pail and the stanchion hose is thus furnished. The type of pulsator that may be utilized is shown in the Hodsdon Patent 1,844,853 of February 9, 1932.

During the operation of the milker unit the pulsating action of the pulsator is effective to cause the teat cup inflations to alternately squeeze and release the cow's teats, thereby causing a flow of the milk from each teat to the milker claw. The claw thereupon conducts the milk to the milking pail by means of a conduit. The flow of this milk is caused by the vacuum depression produced in the milker pail. During the operation of this type of a system it has been found that in cold humid conditions condensation may gather in the stanchion hose and in the conduit leading to the pulsating device. Under certain conditions milk also may be drawn up into the hose. As a result when the stanchion hose to the pulsator is disconnected from the stanchion line the condensation and other liquids present in the line tend to be drawn into the pulsator and subsequently into the receptacle or milker pail. This condition is very undesirable, of course, since the milk in the pail can thus easily become contaminated. In order to overcome this problem, it has been customary to place a check valve in the connecting passage leading from the milker pail to the pulsator. The check valve was intended to prevent the undesirable liquids from entering into the milker pail. Under certain conditions, if the check valve leaks, it is found that the check valve is not sufficient to keep all of the liquids from entering into the milk pail. This may be due to deterioration of the sealing portion of the check valve proper or may be due to faulty operation resulting from the omission of the check valve prior to the milking operation. Also, rough handling and tipping of the milker pail after the stanchion hose has been disconnected may result in leakage of the check valve whereupon liquids may enter into the milker pail. It is the prime object of this invention to provide an improved positive design for preventing any undesirable liquids from entering into the milker pail of a milking unit.

A further object of the invention is to provide a fluid trap associated with the milker pail cover and a pulsator connection for preventing the entrance of undesirable liquid into a milker receptacle.

Still another object is to provide a milker pail having a check valve connection between it and a pulsating device for preventing the entrance of liquids into the pail, and an auxiliary trap arranged to positively collect any of the undesirable liquids which may escape past the check valve.

A still further object is to provide a novel fluid trap which is connected to the milker pail cover of a milking unit, the trap being arranged to collect undesirable liquids that may become collected in the vacuum lines of the system.

These and other objects will become more clearly apparent upon a reading of the specification when examined in connection with the accompanying drawing.

Figure 2:
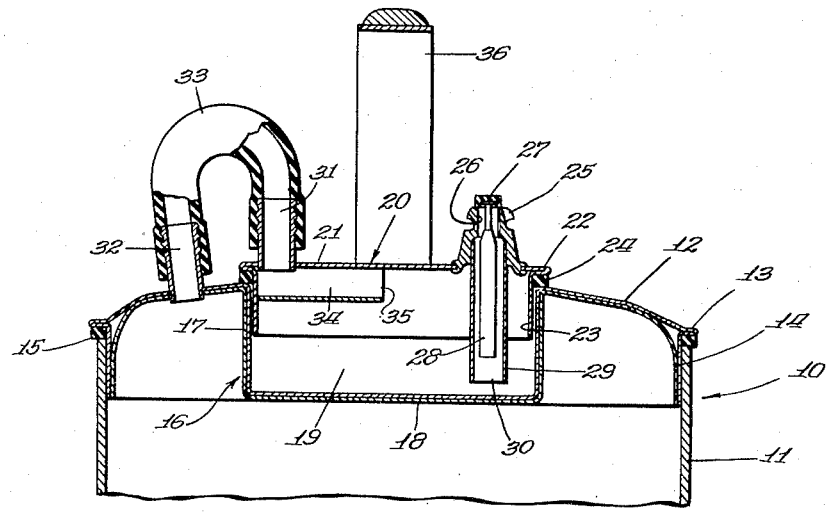
Fig. 2 is a sectional view taken substantially along the line 2—2 of Fig. 1.

Referring particularly to Fig. 2, a milker unit is generally designated by the reference character 10. The milker unit includes a conventional type of milk pail or receptacle 11 having at its upper end a closure member or cover 12. The cover 12 is provided with an annular rim 13 and a downwardly extending annular wall 14. An annular gasket 15 is positioned between the rim 13 of the cover 12 and the upper edge of the pail 11 for providing an effective liquid seal.

The cover 12 is provided with a depressed centrally located portion providing a container or fluid trap 16. The container 16 includes a vertical annular wall 17 conected at its lower end by a horizontally extending bottom 18 thereby providing a fluid receiving chamber 19.

The chamber 19 is open at its upper end and is adapted to be sealed by means of a closure member 20. The closure member 20 is of similar design as the cover 12 and includes a substantially flat horizontal top 21 provided at is outer edge with an annular rim 22. The rim 22 is joined by an annular downwardly extending wall 23 adapted to telescopically engage the wall 17 of the container 16. A gasket 24 is positioned between the rim 22 and the upper edge of the container for securely sealing the chamber 19 during the milking operation.

A pulsator connection or upwardly extending connecting member 25 is secured to the top 21 of the closure member 20. The connection 25 includes a vertically extending bore 26 which is adapted to be sealed by means of a rubber valve member 27 seated over the bore. The valve 27 includes a downwardly extending weight 28 which is adapted to reciprocate within a tubular member or conduit 29. The conduit 29 is in direct communication with the bore 26 and is provided at its lower end with an opening 30 which is positioned substantially close to the horizontally extending bottom 18 of the container.

A hose fitting 31 extends upwardly from the closure member 21 and a hose fitting 32 extends upwardly from the cover 12 substantially adjacent the hose fitting 31. The fittings 31 and 32 are connected by means of a flexible hose 33 which forms a U-shaped connection extending upwardly with respect to the covers 12 and 20. The chamber 19 and the interior of the receptacle 11 are thus placed in communication with one another. The fitting 31 is in direct communication with a longitudinally extending conduit 34. The conduit 34 extends substantially parallel with the flat top 21 and is provided at one end with an opening 35 which is positioned substantially adjacent an imaginary line denoting the center of the chamber 19.

Figure 1:
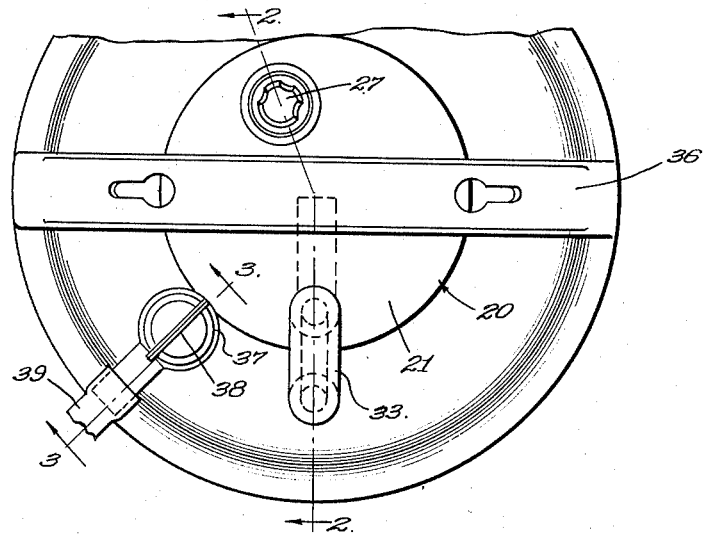
Fig. 1 is a plan view of a milker pail and cover of a milking system.
Figure 3:
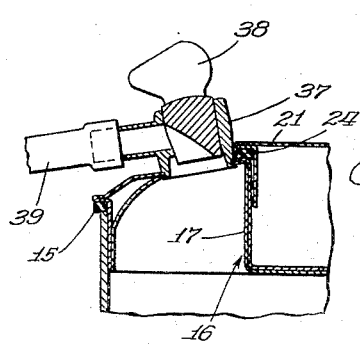
Fig. 3 is a sectional view taken along the line 3—3 of Fig. 1.

As best shown in Figs. 1 and 3 the cover 12 also has connected thereto an upwardly extending milk inlet boss 37 which is adapted to be regulated by means of a milk cock 38. The inlet boss 37 has connected thereto a milk line 39 which extends to a conventional type of milker claw and teat cup cluster (not shown).

During the normal operation of the milker unit the pet cock 38 is in the position shown in Fig. 3. The receptacle or pail 11 is under a vacuum depression and whole milk flows through the conduit 39 into the receptacle. The connecting member 27 suitably supports a pulsator of a type as shown in the patent above mentioned. The pulsator in turn is in communication with a teat cup cluster and a stanchion hose or source of vacuum (not shown). During the operation of the pulsator the valve 27 is drawn upwardly by the vacuum pressure and thus the chamber 19 and receptacle 11 are also in communication with the vacuum source. After the milking operation has been completed, it is customary to disconnect the pulsator stanchion hose from the main vacuum pipeline and thereupon the weight 28 causes the valve 27 to again drop by gravity over the bore 26 of the connecting member 27 in order to seal the bore against the backing up of condensation and other undesirable liquids which might have become collected in the vacuum system. Due to possible deterioration of the valve 27 or possible failure for other reasons, liquid may continue to by-pass the valve 27 and thus enter into the chamber 19. The chamber 19 thus provides an auxiliary means whereby undesirable liquids are trapped as they by-pass the valve 27. The chamber 19 is made of sufficient size to provide enough volume for the greatest amount of liquid that might have collected in the vacuum line. In general, however, the chamber may become only partially filled. By virtue of the novel hose connection 33, between the chamber 19 and the receptacle 11, liquids in the chamber 19 are kept from passing into the interior of the receptacle. Thus, as the operator tends to tip the pail after the milking operation the milk in the receptacle will remain pure and uncontaminated from the liquids gathered in the chamber 19.

Under certain conditions the operator might tip the milk pail a considerable distance on its side or he may remove the cover 12 and lay the same on its side. The novel arrangement of the conduit 34 prevents liquid within the chamber 19 from flowing out into the conduit 33 since the opening 35 of the conduit 34 extends substantially adjacent to the center of the chamber 19. It may readily be appreciated that the conduit 34 can be somewhat shortened or considerably extended in a longitudinal direction within the chamber and the purpose and function of the same will still be to prevent the liquids from entering into the conduit 33 during tipping of the milker pail or cover.

During certain operations where the milker pail is only partially filled, the pail may be moved from one cow stall to the next. It is during this interval that possible tipping of the pail might occur and thus it can be seen that applicant's construction will prevent any undesirable fluids from entering into the pail. After the pail has been moved to a subsequent stall the stanchion hose or vacuum system will again be connected to the pulsator. The valve 28 thereupon moves upwardly and the milking operation again begins. Since the chamber 19 is thus again under a vacuum pressure the undesirable fluids within the trap will leave the chamber and again be forced upwardly through tube 29 into the vacuum system. After the pail has been completely filled the cover 12 is removed to empty the milk from the receiver 11. The closure member 20 may be removed so that the trap may be readily cleaned when milking is finished.

It can thus be seen that the novel arrangement shown by applicant provides a positive fluid trap which keeps the milk from being contaminated by undesirable liquids gathering in the vacuum system. In certain conditions the teat cup inflations and vacuum lines of the teat cups may become cracked and in an occurrence of this type the trap would also function to receive any liquids flowing through the pulsator and pulsator connection 25 that may escape back under check valve 27. It can therefore readily be appreciated that applicant has provided an improvement for a milker pail which is of simple design and yet solves the contamination problems that result from the entrance of liquids that have gathered in the vacuum system.

It must be understood that changes and modifications may be made in the design which do not depart from the spirit of the invention as disclosed nor the scope thereof as defined in the appended claims.

What is claimed is:

A milker unit comprising a receptacle having a removable cover, a fluid trap connected to said cover, said trap including a chamber, a closure member for said chamber, a connecting member connected to the closure member, said connecting member being adapted to support a pulsator to provide for communication between the pulsator and the chamber, a conduit communicating with said connecting member, said conduit having one end projecting into the chamber and substantially adjacent the lower portion thereof, means providing for communication between said chamber and said receptacle, said means including an inverted flexible U-shaped conduit connected to the cover and extending upwardly above said trap, and a longitudinally extending conduit having one open end in communication with the U-shaped conduit and the other open end in communication with the chamber substantially adjacent the center of the same.

FLOYD G. HODSDON.

REFERENCES CITED

The following references are of record in the file of this patent:

UNITED STATES PATENTS

| Number | Name | Date |
|---|---|---|
| 1,111,562 | Burrell | Sept. 22, 1914 |
| 1,344,140 | Macartney | June 22, 1920 |
| 2,122,471 | Hulbert | July 5, 1938 |